United States Patent [19]

Grabmaier et al.

[11] Patent Number: 5,562,860
[45] Date of Patent: * Oct. 8, 1996

[54] PHOSPHOR HAVING REDUCED AFTERGLOW

[75] Inventors: Christa Grabmaier, Berg; Hermann Boedinger, Puchheim; Juergen Leppert, Inning, all of Germany

[73] Assignee: Siemens Aktiengesellschaft, Munich, Germany

[ * ] Notice: The term of this patent shall not extend beyond the expiration date of Pat. No. 5,560,867.

[21] Appl. No.: 501,737

[22] Filed: Jul. 12, 1995

[30] Foreign Application Priority Data

Jul. 29, 1994 [DE] Germany .................. 44 27 021.6

[51] Int. Cl.$^6$ .................................................. C09K 11/84
[52] U.S. Cl. ........................................ 252/301.45; 264/21
[58] Field of Search ..................... 252/301.45; 264/21

[56] References Cited

U.S. PATENT DOCUMENTS 4,733,088  3/1988  Yamada et al. ................ 252/301.45
5,296,163  3/1994  Leppert et al. ...................... 264/21

FOREIGN PATENT DOCUMENTS 47-13244  4/1972  Japan ................. 252/301.4 S
62-27487  2/1987  Japan ................. 252/301.4 S

OTHER PUBLICATIONS

"A Scintillator Gd$_2$O$_2$S:Pr, Ce, F for X–Ray Computed Tomography", Yamada et al., J. Electrochem. Soc. vol. 136, No. 9, Sep. 1989 (pp. 2713–2716).
Chemical Abstract citation 81:83554, corrisponding to JP49–15688, Feb. 12, 1974.

*Primary Examiner*—Melissa Bonner
*Attorney, Agent, or Firm*—Hill, Steadman & Simpson

[57] ABSTRACT

A phosphor for a radiation detector is based on a phosphor ceramic of a rare earth oxisulfide with the general sum formula $(M_{1-x}Ln_x)_2O_2S$, wherein M is at least one element from the group Y, La and Gd, Ln is at least one element of the group Eu, Pr, Tb, Yb, Dy, Sm and Ho, and wherein $(2\times10^{-1}) \geq x \geq (1\times10^{-6})$ and which is doped an element D selected from Zr, Ti and Hf and at least one element A selected from Co, Mn and Ni for reducing the afterglow.

8 Claims, No Drawings

PHOSPHOR HAVING REDUCED AFTERGLOW

BACKGROUND OF THE INVENTION

1. Field of the Invention

The present invention is directed to a phosphor for use in a detector for high-energy radiation, and in particular to such a phosphor having a reduced afterglow (persistence).

2. Description of the Prior Art

A detector for the detection of high-energy radiation can be formed by a phosphor and light detector such as a photodiode or a photomultiplier. Such detectors are widely employed in nuclear medicine and in X-ray diagnostics. The phosphor has the function of absorbing the high-energy radiation and emitting visible light as a consequence of this absorption. This visible light can be detected by a photosensitive element, for example a photodiode, a photomultiplier or a light-sensitive film.

In modern radiation detectors as employed, for example, in X-ray computed tomography, phosphors having extremely low afterglow (persistence) are required in order to achieve an adequately high pulse frequency for the X-ray pulses. A phosphor in widespread used to that purposed is thallium-doped cesium iodide CsI:Tl, however, this phosphor still exhibits an afterglow intensity of approximately $10^{-2}$ through $10^{-3}$ of the initial light intensity 20 msec after the high-energy radiation has been shut off. Phosphors whose afterglow decays significantly faster are required for new-generation radiation detectors.

The oxi-sulfides of the rare earths are more promising phosphors for employment in modern radiation detectors. German OS 36 29 180 discloses a method for the manufacture of a phosphor ceramic with the general composition

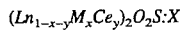

$$(Ln_{1-x-y}M_xCe_y)_2O_2S:X$$

with Ln=Gd, La or Y; M=Eu, Pr or Tb and X=F or Cl with 0<x, y<1. The pigment powder employed as the initial material is thereby filled into a vacuum-tight metal container and is compressed into a ceramic by isostatic hot-pressing. The phosphors obtained in this way, however, exhibit an undesirably pronounced afterglow unless additional measures are undertaken.

In the article "A Scintillator $Gd_2O_2S$:Pr,Ce for X-Ray Computed Tomography," Yamada et al, J.Electrochem. Soc., Vol. 136, No.9, September 1989, pages 2713–2716. The authors propose that a phosphor ceramic of a rare earth oxisulfide be doped with cerium in order to reduce the afterglow. A colored phosphor ceramic whose light yield is reduced is obtained, however, due to the cerium additive. The phosphor is thus degraded in terms of another important characteristic.

SUMMARY OF THE INVENTION

An object of the present invention is to provide a phosphor on the basis of a rare earth oxisulfide that exhibits an improved (reduced) afterglow without sacrificing luminous intensity.

DESCRIPTION OF THE PREFERRED EMBODIMENTS

It was surprisingly found that a slight doping of rare earth oxisulfides, with the general sum formula given below, with an element D, selected from zirconium, titanium, selenium, tellurium or hafnium, and at least one element A, selected from cobalt, nickel, iron, ruthenium and manganese, leads to a large reduction of the afterglow by up to two orders of magnitude. Whereas previously known additives for reducing the afterglow, such as, for example, cerium, lead to a reduction in the light yield, an overall light yield improved, for example, by 20% compared to cerium is obtained with the invention.

The additive is effective given rare earth oxisulfides. Ln preferably comprises for Tb, Pr or Eu.

It is believed that afterglow is produced as a consequence of anion voids in the phosphor which generate traps or deeply disposed conditions that intercept the charge carriers generated by X-rays, and subsequently release them time-delayed, thereby causing a time-delayed luminescent light emission (afterglow).

It is believed that the effect of doping with D is that it is built into the lattice of the phosphor for charge compensation of the dopant A.

Inventively, the additive of D in the ceramic amounts to between $1\times10^{-1}$ and $1\times 10^{-6}$ mol percent, preferably between $1\times10^{-4}$ and $10^{-6}$ mol percent.

Inventively, the additive of the at least one further element A in the ceramic amounts to a total of between $1\times10^{-1}$ and $1\times10^{-6}$ mol percent, preferably between $1\times10^{-4}$ and $1\times10^{-6}$ mol percent.

The inventive phosphor is preferably processed into a high-density and translucent phosphor ceramic that can be utilized for employment in imaging procedures, for example in computed tomography.

! he phosphor powder from which the phosphor or the phosphor ceramic is fabricated can ensue according to conventional methods. For example, it is possible to manufacture the phosphor powder according to a flux process. To that end, the metals contained in the phosphor such as oxides, carbonates, chlorides, fluorides, sulfides or other suitable compounds are melted together with sulphur and alkali compounds suitable as a fluxing agent. After the solidification of the melt, it is leached and washed in order to remove to alkali compounds used as the fluxing agent.

It is also possible to place the metal compounds in solution in the desired ratio and then to precipitate them in a suitable way. To that end, for example, the rare earth oxides can be placed into solution with a hydrogen sulfite complex and can be precipitated as a sulfite or as a sulfate. In a further step, a reduction of the sulfites or sulfates to the desired oxisulfides is then required.

The manufacture of the phosphor powder by precipitation from solution has the advantage that the dopings, which are present in only a small proportion, are uniformly distributed over the entire powder. The guarantees the manufacture of a uniform phosphor ceramic with properties uniformly distributed over the ceramic body.

In a modified method, the sulfite powder obtained by precipitation is reduced to the oxisulfide in a furnace under a forming gas atmosphere and is subsequently treated under a hydrogen-sulphur vapor atmosphere in a further temperature step. This process yields a phosphor powder that has no inclusions of foreign phases at all and that, in addition to have an exact stoichiometry, has a large surface of more than 10 m² per gram (according to BET).

Before being further-processed into ceramic, a phosphor powder with the inventive composition produced according to one of the above methods is first ground and, if necessary, homogenized. For an imaging use, a suitable phosphor ceramic must have a high density of 96 percent or more with reference to the theoretically maximum density in order to have the required optical purity and translucence. This high density can be achieved, for example, by isostatic hot-pressing of the phosphor powder. To this end, the phosphor powder is filled into a gas-tight container made of a deformable metal. This container is then charged with a pressure between 50 and 200 Mpa on all sides at a temperature between 800° and 1700° C.

In a less complicated method, the phosphor powder can be processed into a high-density phosphor ceramic by single-axis hot-pressing. A phosphor powder that has a high surface of more than 10 m²/g according to BET is required, however, for this purpose. Heretofore, such a powder has only been capable of being obtained with the above-described process via the sulfite precipitation.

The invention shall be set forth in greater detail below with reference to an exemplary embodiment.

PRODUCTION OF THE PHOSPHOR POWDER

A phosphor powder is used having the gross composition $(Gd_{1-x-y-z}Pr_xCo_yZr_z)_2O_2S$, wherein $x=1\times10^{-3}$, $y=2.5\times10^{-5}$ and $z=2.5\times10^{-5}$, and wherein M=Gd, Ln=Pr and A=Co.

To that end, a suitable gadolinium compound, for example gadolinium oxide $Gd_2O_3$, is converted into the corresponding hydrogen sulfite complex:

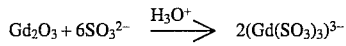

$$Gd_2O_3 + 6SO_3^{2-} \xrightarrow{H_3O^+} 2(Gd(SO_3)_3)^{3-}$$

Sulphur dioxide is introduced into the aqueous suspension. A clear solution of the hydrogen sulfite complex arises.

This solution is pumped through a 0.2 μm filter for particle removal. The dopant additives praseodymium, zirconium and cobalt that are still lacking can now be added at this stage in the proper ratios prescribed by the formula. The addition preferably ensues as a solution or suspension of the corresponding oxides, sulfides, chlorides, nitrates, carbonates of other suitable compounds of the metals or dopants.

The sulphur dioxide is now driven out of the solution, whereby the gadolinium together with the dopants is completely precipitated from the solution as a sulfite:

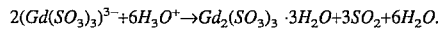

$$2(Gd(SO_3)_3)^{3-}+6H_3O^+ \to Gd_2(SO_3)_3 \cdot 3H_2O + 3SO_2 + 6H_2O.$$

The entire process, especially the handling of the solid powder, ensues in an inert gas or in a reducing atmosphere in order to prevent an oxidation of the hydrogen sulfite complex or of the solid sulfite to the sulfate.

The dried gadolinium sulfite powder is now heated to, for example, 700° C. in a reducing atmosphere, for example in forming gas having the composition 80 percent $N_2$/20 percent $H_2$. The gadolinium sulfite is thereby reduced to gadolinium oxisulfide $Gd_2O_2S$.

The reduction of the gadolinium sulfite can also be undertaken with other gasses having a reducing effect, for example by introducing carbon monoxide, hydrogen or forming gas having some other composition. The temperature required for the reduction can be selected between 400° and 800° C. The phosphor powder obtained in this way has a desired, large specific surface of, for example, 35 m²/g. It can also have foreign phase inclusions that do not correspond to the indicated gross sum formula. This is especially observed when, in a version of the method, pure gadolinium sulfide is produced and is only subsequently mixed with suitable compounds of the dopants. For completion of the stoichiometry, a further reduction step can be implemented in this case, the phosphor powder that has been obtained being exposed to a hydrogen/sulphur vapor atmosphere for this reduction. The same temperature conditions as in the first reduction step are selected.

Phosphor ceramic wafers are now produced from the phosphor powders, for example by single-axis hot-pressing. To that end, the powder is filled into a press die and is first pre-pressed cold and dry at a pressure of 50 MPa. Subsequently, heating to a temperature of 1100° through 1300° C. is carried out in a hot press, initially unpressurized, whereby the phosphor powder is sintered to approximately 80 through 85 percent of the theoretical density. Only thereafter is the pressing power of approximately 50 MPa built up and the phosphor powder completely compressed to form a phosphor ceramic.

The same example can be repeated with analogously produced phosphor powders wherein Zr is replaced by Ti, Hf, Se or Te, and Co is replaced by Mn, Ni, Fe or Ru. A phosphor can thus be produced doped with Zr and at least one of Co, Ni and/or Mn with a total dopant concentration in a range from $10^{-1}$ though $10^{-6}$ mol percent.

The phosphor ceramic members removed from the die are now charged with X-radiation under various conditions in order to quantitatively acquire their luminous properties, particularly the afterglow.

Afterglow intensities of $10^{-3.2}$ compared to the initial intensity occur 4 ms after shut-off of the X-ray source. Compared to a "pure" $Gd_2O_2S$:Pr light-emitting ceramic, this is a value that is improved by about 1.5 through 2.0 orders of magnitude, and lies in the range of a Ce-doped $Gd_2O_2S$:Pr light-emitting ceramic. The absolute light yield, by contrast, is improved by approximately 20% compared to a Ce-doped $Gd_2O_2S$:Pr light-emitting ceramic.

Thus a phosphor with the inventive additive of an element D and an element A exhibits an afterglow reduced by a number of orders of magnitude compared to the same phosphor without this additive. Given conditions that are otherwise the same, the corresponding, additive-free phosphor ceramic still exhibits an afterglow after the aforementioned time interval that amounts to $10^{-2}$ times the initial luminous intensity.

Due to the improved luminous properties, the inventive phosphor is especially suited for employment in a computer tomograph apparatus.

Although modifications and changes may be suggested by those skilled in the art, it is the intention of the inventors to embody within the patent warranted hereon all changes and modifications as reasonably and properly come within the scope of their contribution to the art.

We claim as our invention:

1. A high-density ceramic phosphor, having a density which is at least 96% of a theoretical maximum density, for a radiation detector, said high density ceramic phosphor comprising a rare earth oxisulfide having a general sum formula $(M_{1-x} Ln_x)_2O_2S$, wherein M is at least one element selected from the group consisting of Y, La and Gd, Ln is at least one element selected from the group consisting of Pr, Tb, Yb, Dy, Sm and Ho, and wherein $(2\times10^{-1}) \geq x \geq (1\times10^{-6})$ doped with an element D selected from the group consisting of Zr, Hf, Se, Te and Ti and at least one element A selected from the group consisting of Co, Ni, Fe, Ru and Mn, in respective, individual dopant proportions of $10^{-1}$ through $10^{-6}$ mol percent.

2. A phosphor as claimed in claim 1, containing at least one element from the group consisting of Co, Ni, Fe, Ru or Mn in a proportion of a total of $10^{-4}$ through $10^{-6}$ mol percent.

3. A phosphor as claimed in claim 2, containing whereby the element D in a proportion between $10$–$4$ and $10^{-6}$ mol percent.

4. A phosphor as claimed in claim 1, containing whereby the element D in a proportion between $10^{-4}$ and $10^{-6}$ mol percent.

5. A method for manufacturing a high density ceramic phosphor having a density which is at least 96% of a theoretical maximum density and a reduced afterglow, comprising the steps of: homogenizing a phosphor powder having a general sum formula $(M_{1-x-y-z}Ln_xD_yA_z)_2O_2S$, wherein M is at least one element selected from the group consisting of Y, La and Gd, Ln is at least one element selected from the group consisting of Pr, Tb, Yb, Dy, Sm and Ho, D is an element selected from the group consisting of Zr, Hf, Se, Te and Ti, and A is at least element selected from the group consisting of Co, Ni, Fe, Ru and Mn, and wherein $(2\times10^{-1})\geq x\geq(1\times10^{-6})$ and $(1\times10^{-1})\geq y,z\geq(1\times10^{-6})$; and compressing the phosphor powder to form a ceramic under pressure at temperatures above 1200° C. in an inert or reducing atmosphere.

6. A method as claimed in claim 5, comprising the additional step of using a phosphor powder having a specific surface area of at least $10m^2/g$ determined according to BET.

7. A method as claimed in claim 6, wherein the step of compressing said phosphor powder comprises single-axis hot-pressing said phosphor powder.

8. A high density ceramic phosphor having a density which is at least 96% of a theoretical maximum density and a reduced afterglow, comprising a rare earth oxisulfide phosphor ceramic doped with Zr and at least one element selected from the group consisting of Co, Ni and Mn in a total dopant concentration in said ceramic in a range from $10^{-1}$ through $10^{-6}$ mol percent.

* * * * *